(12) United States Patent
Singer et al.

(10) Patent No.: US 11,145,917 B2
(45) Date of Patent: Oct. 12, 2021

(54) CELL BALANCING NETWORK TO HEAT BATTERY PACK

(71) Applicant: International Business Machines Corporation, Armonk, NY (US)

(72) Inventors: Noah Singer, White Plains, NY (US); Steven John Ahladas, Highland, NY (US); Xiangfei Yu, Wappingers Falls, NY (US); Robert K. Mullady, Ulster, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 16/272,572

(22) Filed: Feb. 11, 2019

(65) Prior Publication Data

US 2020/0259225 A1 Aug. 13, 2020

(51) Int. Cl.
| | |
|---|---|
| *H01M 10/615* | (2014.01) |
| *H01M 10/653* | (2014.01) |
| *H01M 10/44* | (2006.01) |
| *H01M 10/48* | (2006.01) |
| *H01M 10/6571* | (2014.01) |
| *H02J 7/00* | (2006.01) |
| *H01M 10/42* | (2006.01) |

(52) U.S. Cl.
CPC ....... *H01M 10/615* (2015.04); *H01M 10/425* (2013.01); *H01M 10/441* (2013.01); *H01M 10/443* (2013.01); *H01M 10/486* (2013.01); *H01M 10/653* (2015.04); *H01M 10/6571* (2015.04); *H02J 7/0014* (2013.01); *H01M 2010/4271* (2013.01)

(58) Field of Classification Search
CPC ............. H01M 10/615; H01M 10/653; H01M 10/441; H01M 10/486; H01M 10/6571; H01M 10/443; H01M 10/425; H01M 2010/4271; H01M 10/633; H02J 7/0014; Y02E 60/10
USPC ........................................................ 320/150
See application file for complete search history.

(56) References Cited

U.S. PATENT DOCUMENTS 5,362,942 A 11/1994 Vanderslice, Jr. et al.
5,534,788 A * 7/1996 Smith .................... G01R 1/203
324/431

(Continued)

FOREIGN PATENT DOCUMENTS

EP 0998779 B1 * 12/2004 ............ H02J 7/0021
GB 2501512 A 10/2013

OTHER PUBLICATIONS

C. Zhang et al., "PTC Self-heating Experiments and Thermal Modeling of Lithium-ion Battery Pack in Electric Vehicles", (www.mdpi.com/journal/energies); Energies 2017, 10, 572, 21 pgs.

*Primary Examiner* — M'Baye Diao
(74) *Attorney, Agent, or Firm* — Cantor Colburn LLP; Tihon Poltavets

(57) ABSTRACT

A method for increasing temperature of a battery pack includes determining whether a temperature of a cell in the battery pack is above a lower threshold temperature. The method further includes charging, by a current directly from a charger, a balancing circuit including a resistor in proximity to the cell. The method also includes increasing the temperature of the cell in the battery pack.

5 Claims, 8 Drawing Sheets

(56) References Cited

U.S. PATENT DOCUMENTS

| | | | | |
|---|---|---|---|---|
| 5,576,612 | A * | 11/1996 | Garrett | H01M 10/42 320/106 |
| 5,604,415 | A * | 2/1997 | Vashi | H01M 10/46 320/106 |
| 5,635,821 | A * | 6/1997 | Smith | H02J 7/0031 320/103 |
| 5,898,291 | A * | 4/1999 | Hall | H02J 7/0026 320/121 |
| 6,046,575 | A * | 4/2000 | Demuro | H02J 7/0031 320/134 |
| 6,072,301 | A | 6/2000 | Ashtiani et al. | |
| 7,274,100 | B2 * | 9/2007 | Pavier | H01L 23/5383 257/724 |
| 7,602,146 | B2 * | 10/2009 | Carrier | H02J 7/0014 320/120 |
| 7,884,577 | B2 | 2/2011 | Tsutsumi et al. | |
| 7,973,514 | B2 * | 7/2011 | Gong | H02J 7/0016 320/122 |
| 7,973,534 | B2 * | 7/2011 | Tatebayashi | H02J 7/0049 324/433 |
| 8,452,490 | B2 | 5/2013 | Lakirovich et al. | |
| 8,816,639 | B2 * | 8/2014 | Lu | H02J 7/0016 320/118 |
| 8,859,119 | B2 | 10/2014 | Robertson | |
| 8,975,870 | B2 * | 3/2015 | Maruyama | H02J 7/0016 320/118 |
| 9,005,788 | B2 * | 4/2015 | Zhu | H01M 10/617 429/90 |
| 9,030,167 | B2 * | 5/2015 | Yamaguchi | H01M 10/441 320/119 |
| 9,099,871 | B2 * | 8/2015 | White | H02J 7/0014 |
| 9,148,029 | B2 * | 9/2015 | Tsai | H02J 7/0016 |
| 9,184,602 | B2 * | 11/2015 | Kim | H02J 7/00 |
| 9,362,759 | B2 * | 6/2016 | Nakao | H01M 10/4207 |
| 9,373,953 | B2 * | 6/2016 | Kimura | H02J 7/00 |
| 9,509,152 | B2 * | 11/2016 | Peh | H01M 10/63 |
| 9,537,332 | B2 * | 1/2017 | Cotton | H02J 7/0016 |
| 9,755,284 | B2 | 9/2017 | Nubbe | |
| 9,851,407 | B2 | 12/2017 | Keating, I et al. | |
| 10,044,069 | B2 * | 8/2018 | Despesse | H01M 10/486 |
| 2005/0269989 | A1 * | 12/2005 | Geren | H02J 7/0016 320/119 |
| 2009/0066291 | A1 * | 3/2009 | Tien | H02J 7/0069 320/118 |
| 2009/0072790 | A1 * | 3/2009 | Ibrahim | H02J 7/0031 320/134 |
| 2012/0001595 | A1 * | 1/2012 | Maruyama | H02J 7/0016 320/118 |
| 2012/0086400 | A1 * | 4/2012 | White | H02J 7/0016 320/118 |
| 2016/0020496 | A1 | 1/2016 | Burrows et al. | |
| 2016/0181837 | A1 * | 6/2016 | Shu | H02J 7/14 320/119 |
| 2016/0241058 | A1 * | 8/2016 | Carralero | H02J 7/007 |
| 2020/0161877 | A1 * | 5/2020 | Zhang | B60L 53/62 |

\* cited by examiner

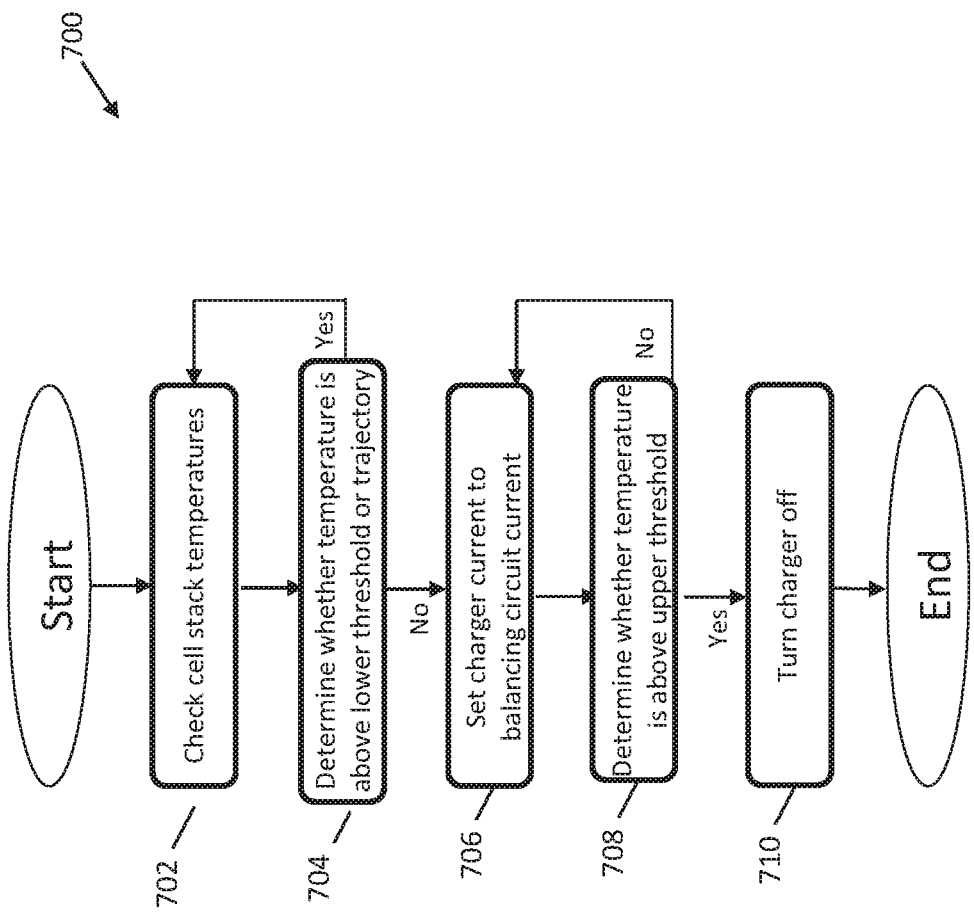

CELL BALANCING NETWORK TO HEAT BATTERY PACK

BACKGROUND

The present invention generally relates to batteries. More specifically, the present invention relates to using cell balancing networks to heat battery packs.

A battery pack includes a plurality of battery cells connected in series, parallel or both. The useable energy of the battery pack is defined by the charge or energy storage capacity of the battery cells, the number of battery cells, and the differential in the state of charge between the most charged and least charged cell in the series.

A battery pack also includes a battery management system (BMS). The BMS includes electronic circuitry (e.g., balancing circuitry) that monitors and controls the cells in a battery pack. A balancing circuit is arranged in parallel with each battery cell in the battery cell stack. The BMS provides cell balancing during charge/discharge, or in particular to balance the level of charge, voltage, or energy in each of the cells so each cell can deliver the same total output of energy. The BMS, therefore, maximizes the overall usable energy of the battery pack by minimizing the difference between the cell with the lowest charge state and the cell with the highest charge state.

SUMMARY

Embodiments of the present invention are directed to a method for increasing temperature of a battery pack. A non-limiting example of the method includes determining whether a temperature of a cell in the battery pack is above a lower threshold temperature. The method further includes charging, by a current directly from a charger, a balancing circuit including a resistor in proximity to the cell. The method also includes increasing the temperature of the cell in the battery pack.

Another non-limiting example of the method includes determining whether a temperature of a cell in the battery pack is above a lower threshold temperature. The method further includes sending a current, directly from a charger, to a balancing circuit coupled to the cell to dissipate heat from a resistor. The method includes increasing the temperature of the cell in the battery pack. The method further includes discontinuing the current from the charger once the cell has reached an upper threshold temperature.

Embodiments of the present invention are directed to a battery pack. A non-limiting example of the battery pack includes a battery cell coupled to an electronic device and a balancing circuit. The battery pack also includes a resistor arranged in proximity to the battery cell. The battery pack includes a charger coupled to the balancing circuit. The charger is configured to send a current directly to the balancing circuit.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts a flow chart of a method for heating a battery pack according to embodiments of the present invention;

Figure 1:
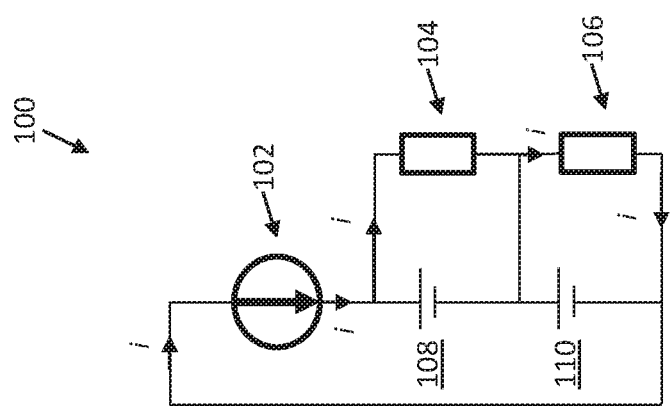
FIG. 1 depicts a circuit layout of a system according to embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

For the sake of brevity, conventional techniques related to circuitry and battery fabrication may or may not be described in detail herein. Moreover, the various tasks and process steps described herein can be incorporated into a more comprehensive procedure or process having additional steps or functionality not described in detail herein. In particular, various steps in the manufacture of circuits and batteries are well known and so, in the interest of brevity, many conventional steps will only be mentioned briefly herein or will be omitted entirely without providing the well-known process details.

Turning now to an overview of technologies that are more specifically relevant to aspects of the invention, battery systems are generally required to operate across a range of ambient temperatures (e.g., −40° C. to +60° C.) in their application. As ambient temperature decreases, cell capacity degrades and may degrade to the point where there is not enough capacity available to meet application requirements. Therefore, potential low-temperature conditions need to be planned for, and a method for maintaining cells above a minimum threshold temperature is needed.

Although various methods have been used to address potential low temperatures in battery packs, such methods generally result in undesired higher weight and cost. For example, increasing the battery cell count to include enough cells to operate at low temperatures increases manufacturing cost and weight. Similarly, adding heating elements in close proximity to the cells to keep them at optimal temperatures decreases efficiency and increases cost and complexity. Accordingly, a method of maintaining battery cells in a battery pack above a minimum threshold temperature, without a significant increase in weight or cost, is needed.

Turning now to an overview of the aspects of the invention, one or more embodiments of the invention address the above-described shortcomings of the prior art by providing methods, systems, and devices including a battery pack with a voltage balancing circuit that can include heat dissipating resistors and a charger directly coupled to balancing circuits. Each balancing circuit is coupled to a cell of the battery pack. The battery cell temperature can be monitored by thermistors, which are part of the BMS. When cells fall below a threshold temperature, or when the Battery Management System (BMS) detects a downward trend in cell stack temperature, the charger activates the balancing circuits by directly sending a current to the cell balancing circuits. The balancing circuits dissipate heat from the resistors that increases the temperature of the ambient air, and thus battery cells in proximity, and maintains cell temperatures above a threshold temperature.

The above-described aspects of the invention address the shortcomings of the prior art by directly passing current through balancing circuits, without passing current through the battery cells, which prevents the cells from being discharged and therefore preserves cell life. The balancing circuits are already part of the BMS of the battery pack, and thus, the system does not result in a substantial increase in manufacturing cost, weight, or complexity. There is no physical limit, and the systems can be scaled to meet any application.

Turning now to a more detailed description of aspects of the present invention, FIG. 1 depicts a circuit layout of a system 100 according to embodiments of the present invention. The system 100 includes a first battery cell 108 and a second battery cell 110. Although two battery cells (first battery cell 108 and second battery cell 110) are shown in the system 100, any number of battery cells can be included. According to embodiments of the present invention, the systems described herein include one or more battery cells, such as a plurality of battery cells.

The first and second battery cells 108, 110 can include any types of battery cells that use a balancing circuit for optimization. According to one or more embodiments of the present invention, the first and second battery cells 108, 110 include lithium-ion batteries.

The system 100 includes a first balancing circuit 104 coupled to the first battery cell 108, and a second balancing circuit 106 coupled to the second battery cell 110. Although two balancing circuits (first balancing circuit 104 and second balancing circuit 106) are shown in the system 100, any number of cells and balancing circuits can be included. According to embodiments of the present invention, the systems described herein include one or more balancing circuits, such as a plurality of balancing circuits, with each balancing circuit coupled to a battery cell.

First balancing circuit 104 and second balancing circuit 106 each include a resistor or plurality of resistors that dissipates heat and a MOSFET or other switchable device. A plurality of resistors can be advantageous to distribute the heat evenly across the battery cell. A charger 102 is directly coupled (or connected) to the first balancing circuit 104 and second balancing circuit 106. According to some embodiments of the present invention, the resistors of each of the first balancing circuit 104 and the second balancing circuit 106 each have a total power of 1 Watt (W).

The charger 102 is activated when the temperatures of the first and second battery cells 108, 110 fall below a lower threshold temperature, or when the BMS detects a downward trend in temperature. The charger 102 produces a current (i) that travels directly to the first and second balancing circuits 104, 106. When the charger is activated, the MOSFET or other switchable device is also closed in each balancing circuit and current (i) flows through the resistors of the first and second balancing circuits 104, 106, electrical energy is converted into heat, which is dissipated into the air surrounding the first and second balancing circuits 104, 106, and first and second battery cells 108, 110. The first and second balancing circuits 104, 106 are in proximity to the first and second battery cells 108, 110, so dissipated heat increases the temperature of the ambient air and maintains the temperature above the lower threshold temperature.

Figure 2:
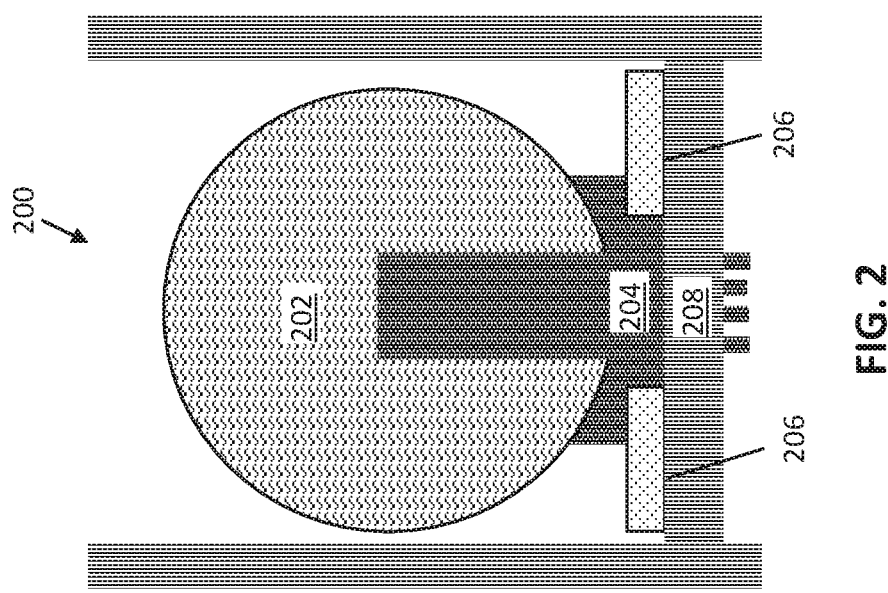
FIG. 2 depicts an end view of a battery cell in proximity to resistors according to embodiments of the present invention.

FIG. 2 depicts an end view of a battery cell 200 coupled to cell balancing circuits with cell balancing resistors 206 according to embodiments of the present invention. The battery cell 200 includes a casing 202 coupled to a conductive tab 204 that connects the battery cell 200 to a battery powered component, such as an electronic device 208. According to one or more embodiments of the present invention, the electronic device 208 coupled to the battery cell is a printed circuit board (PCB).

One or more cell balancing circuits with cell balancing resistors 206 are coupled to the electronic device 208 and are arranged in proximity to the battery casing 202. The number of resistors can be tuned to the particular application. The cell balancing circuits with the cell balancing resistors 206 are not limited in type or material. The cell balancing resistors can be any type pf electrical resistor.

Figure 3:
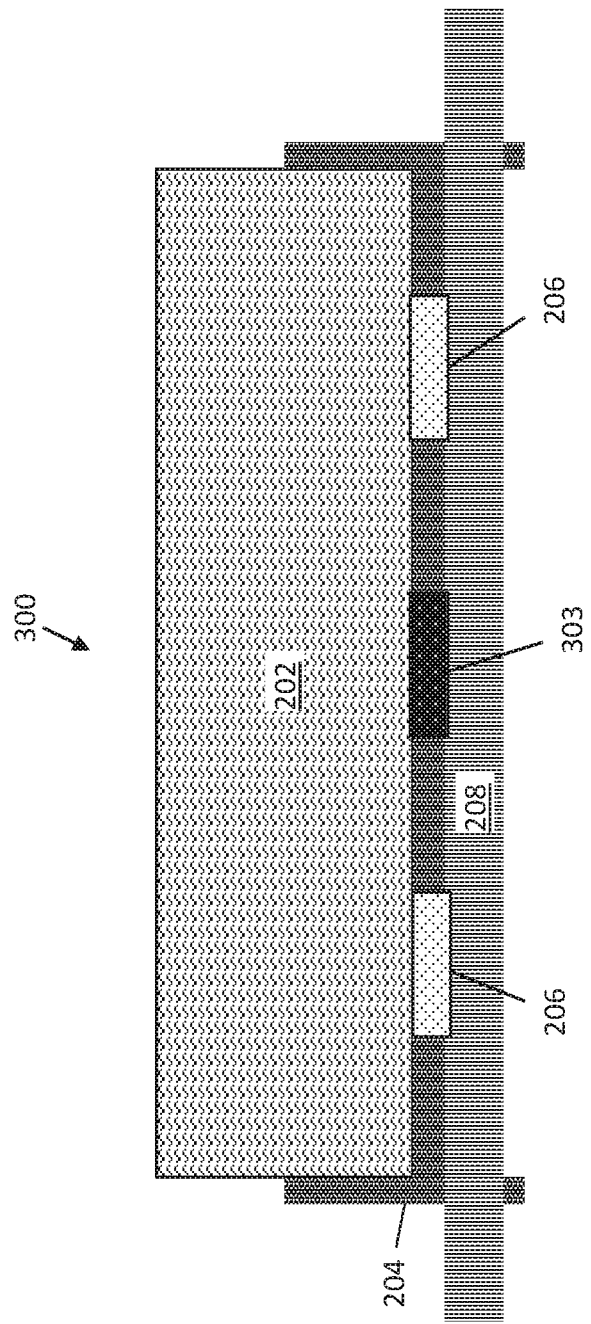
FIG. 3 depicts a side view of a battery cell coupled to resistors and a thermistor according to embodiments of the present invention.

FIG. 3 depicts a side view of a battery cell 300 coupled to cell balancing circuits with cell balancing resistors 206 and a thermistor 303 according to embodiments of the present invention. The battery cell 300 includes one cell balancing circuit with four cell balancing resistors 206 (two on opposite side of cell and not shown in this view). Although one cell balancing circuit with four balancing resistors 206 are shown in the battery cell 300, the battery cell 300 can be coupled with any number of balancing resistors 206 to distribute the heat.

The thermistor 303 monitors the temperature of the battery cell 300 as part of the BMS. If the temperature of the battery cell 300 drops below a threshold temperature, the BMS and control circuitry determines when to start or stop passing current through the balancing circuits. The actual temperature of the battery cell 300 (or cell stack when included amongst a plurality of cells), or a trend of temperatures of the cell or stack can be used to trigger the charger to send a current to the balancing resistors.

In some embodiments of the present invention, the broad range for battery pack operation is about 5° C. to about 40° C. According to one or more embodiments of the present invention, the lower threshold temperature is about 15° C. to about 20° C. According to other embodiments of the present invention, the lower threshold temperature is about 25° C. to about 30° C.

The heat output of the cell balancing circuits with cell balancing resistors 206 can be controlled to very accurately tune the cell temperature, which allows the battery pack temperature to be maintained in a very narrow range for optimal performance.

Figure 4:
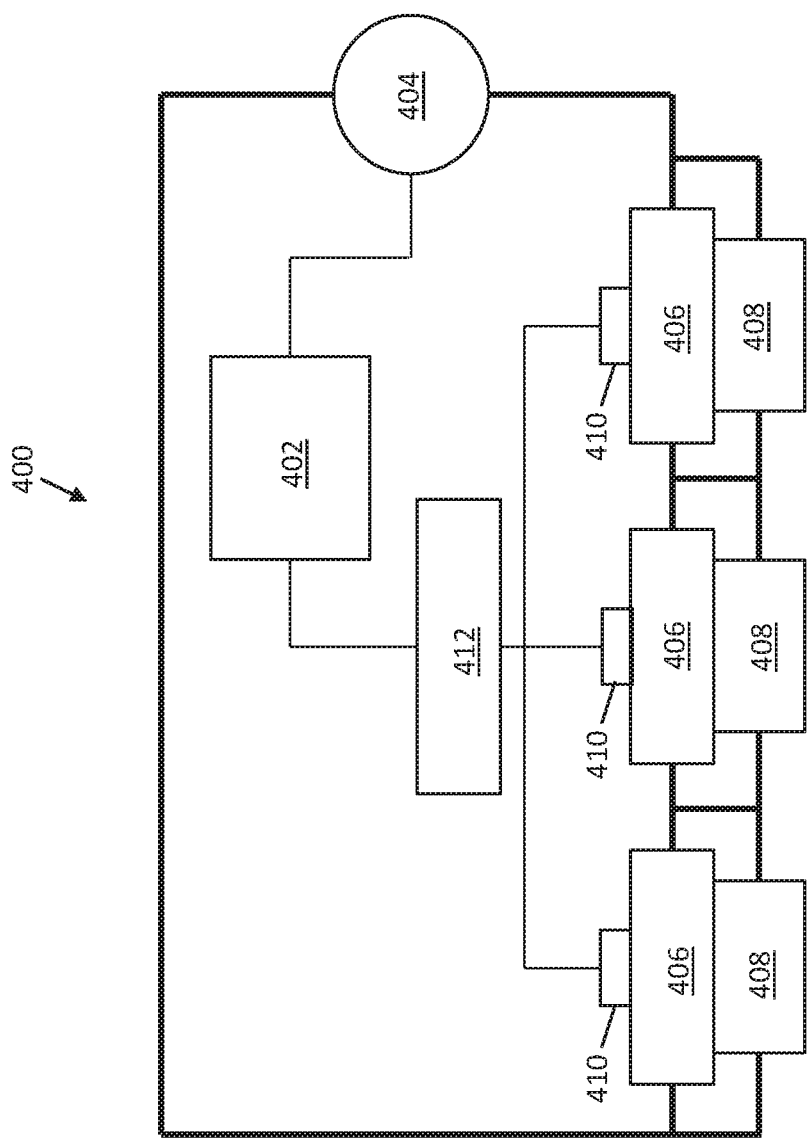
FIG. 4 depicts a block diagram of a control scheme for controlling systems according to embodiments of the present invention.

FIG. 4 depicts a block diagram of a control scheme 400 for controlling the systems according to embodiments of the present invention. Each battery cell 406 of a battery pack, which are coupled in series, is coupled to balancing circuit 408. A thermistor 410, which is part of the BMS, monitors the temperature of the battery cell 406. A thermistor 410 is also coupled to each battery cell 406. The BMS chip 412 includes the cell balancing circuitry. When a battery cell 406 reaches a threshold temperature, based on measurements taken by the thermistor 410, the BMS chip sends a signal to the controller 402 (or microcontroller) to turn on the charger 404 and close each MOSFET or switchable device. The charger 404 sends a current (charge) to the balancing circuits 408, and the cell balancing resistors dissipate heat to increase the temperature of the battery cells 406 of the battery pack.

The current running from the charger 404 to the cell balancing circuits 408 does not pass through the battery cells 406, which preserves battery cell life. Since the battery cells 406 are not being discharged, the full capacity of the battery pack is always available for use.

Figure 5:
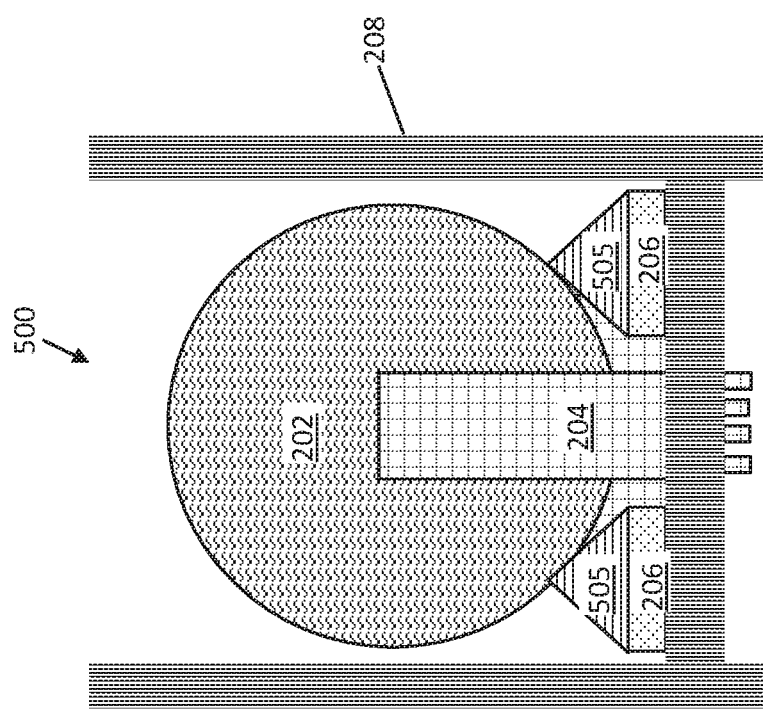
FIG. 5 depicts an end view of a battery cell coupled to thermal interface material and resistors according to embodiments of the present invention.

FIG. 5 depicts an end view of a battery cell 500 with a thermal interface material 505 (TIM) and cell balancing circuits with cell balancing resistors 206 according to embodiments of the present invention. The thermal interface material 505 is arranged between the cell balancing resistor 206 and the battery casing 202. The thermal interface material 505 directly contacts the cell balancing resistor 206 and the battery casing 202. The thermal interface material 505 improves heat transfer to the battery cell and increases efficiency.

Non-limiting examples of materials for the thermal interface material 505 include thermal grease, thermal gap pads, phase change materials, or other like materials.

Figure 6:
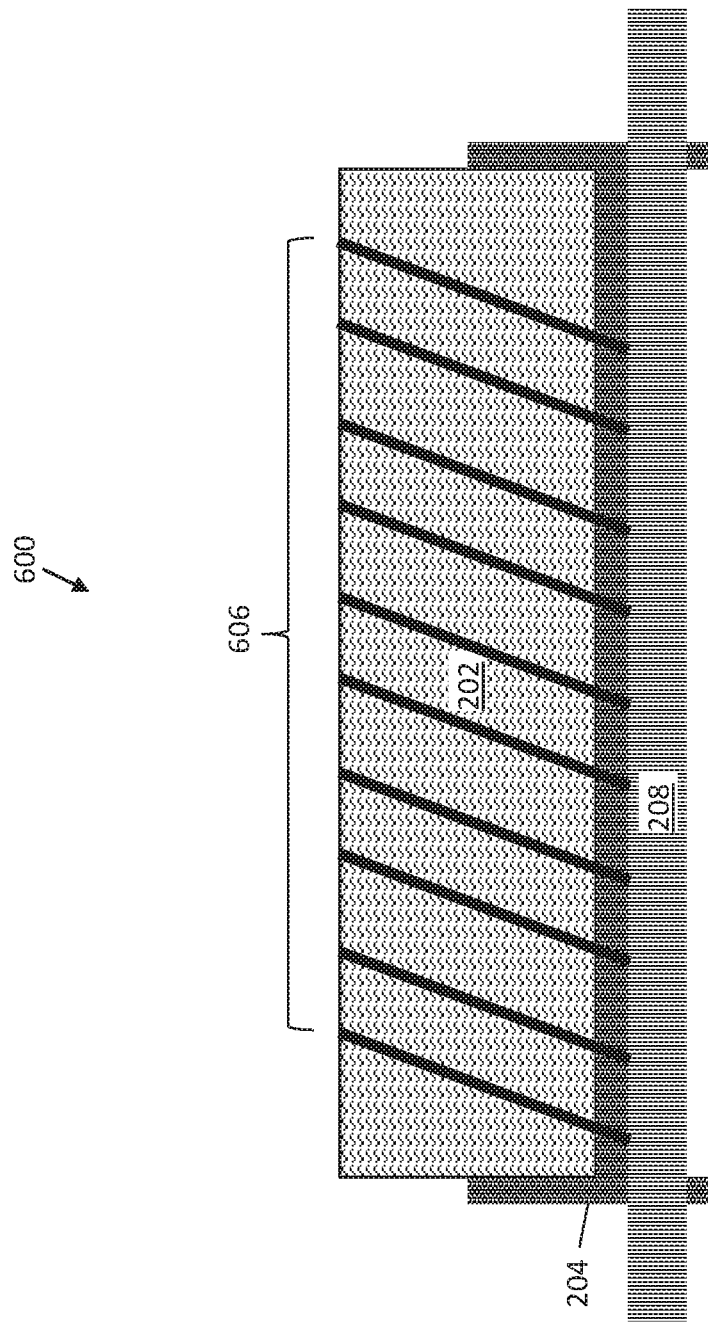
FIG. 6 depicts a side view of cell balancing resistive wire wrapped around a battery cell according to embodiments of the present invention.

FIG. 6 depicts a side view of a battery cell 600 with cell balancing resistive wire 606 according to embodiments of the present invention. The cell balancing resistive wire 606 is wrapped around the casing 202 of the battery cell. The heat dissipated from the cell balancing resistive wire 606 is transferred directly to the battery cell 600.

The temperature of the battery cell 600 can be monitored by thermistors, which are part of the BMS. When temperature falls below a threshold temperature, or when the BMS detects a downward trend in cell stack temperature, the charger can activate the balancing circuits by directly sending a current to the cell balancing circuits. The balancing circuits dissipate heat from the cell balancing resistive wire 606 that increases the temperature of the ambient air, and thus battery cells in proximity, and maintains cell temperatures above a threshold temperature.

A non-limiting examples of materials for the cell balancing resistive wire 606 includes an alloy including nickel, chromium, and optionally iron, e.g., Nichrome.

FIG. 7 depicts a flow chart of a method 700 for heating a battery pack according to embodiments of the present invention. As shown in box 702, the method 700 includes checking the cell stack temperature. The temperature of the cell stack is reported to the microcontroller.

As shown in box 704, the method 700 includes determining whether the temperature of the cell stack is above a lower threshold temperature or determining the trajectory of the temperature. If the cell stack temperature is not above a lower threshold temperature, the method 700 includes, as shown in box 706, setting the charger current to the balancing circuit current to warn the cell stack. A current is sent directly from the charger to the balancing circuit to charge the balancing circuit. The resistors in the cell balancing circuits dissipate heat to the cell stack in proximity to increase their temperature. The trajectory of the temperature, or pattern of temperature change, can also be determined to anticipate when the cell stack will need to be warmed. If the cell stack temperature is above a lower threshold temperature, then the method 700 repeats with checking the cell stack temperature, box 702.

The method 700 includes, as shown in box 708, determining whether the temperature of the cell stack is above an upper threshold temperature. If the cell stack temperature is above the upper threshold temperature, then the charger is turned off, as shown in box 710. The current from the charger is discontinued once the cell has reached an upper threshold temperature. If the temperature of the cell stack is not above the upper threshold temperature, then the charger remains on and the method 700 repeats with setting the charger current to the balancing circuit current, as shown in box 706.

Figure 8B:
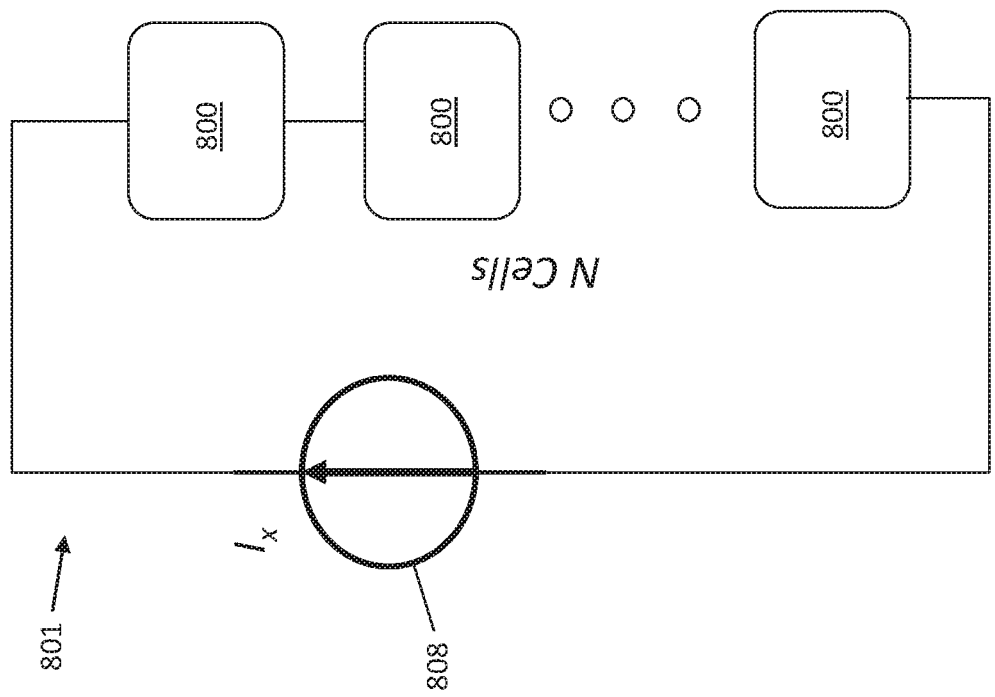
FIG. 8B depicts a diagram of using a plurality of balancing cells with analog balancing capacity to increase a temperature of a battery pack.
Figure 8A:
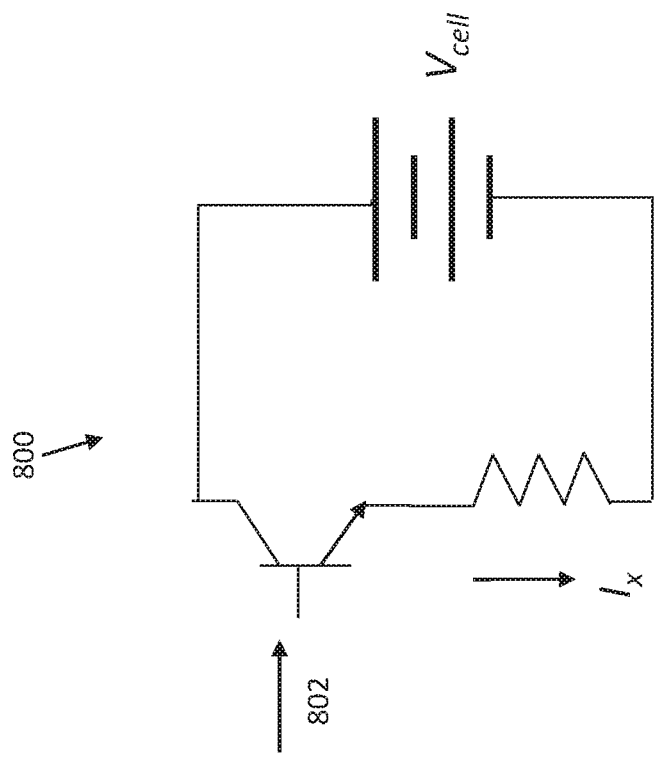
FIG. 8A depicts a circuit layout of a balancing cell with analog balancing capacity according to embodiments of the present invention.

The temperature of the battery pack can be regulated by varying the power. For example, balancing circuits with analog capacity can be used to achieve temperature regulation by setting the heat dissipation. FIG. 8A depicts a circuit layout of a balancing circuit 800 with analog balancing capacity according to embodiments of the present invention. The balancing circuit 800 has analog capacity for balancing, and the power 802 in the balancing circuit can be adapted to achieve temperature regulation by setting the dissipation in the balancing circuit 800. FIG. 8B depicts a diagram of a system 801 that includes a balancing circuits 800 with analog balancing capacity according to embodiments of the present invention. A plurality of balancing circuits 800 are coupled with battery cells and a charger 808. The charger 808 can vary the current ($I_x$), and the power dissipated is equal to $N*I_x*V_{cell}$.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The flowchart and block diagrams in the Figures illustrate possible implementations of fabrication and/or operation methods according to various embodiments of the present invention. Various functions/operations of the method are represented in the flow diagram by blocks. In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for increasing temperature of a battery pack, the method comprising:
   determining whether a temperature of a cell in the battery pack is above a lower threshold temperature, the cell coupled to an electronic device that is a printed circuit board, and a thermal interface material arranged between the cell and the printed circuit board;
   charging, by a current directly from a charger, a balancing circuit comprising a MOSFET and a plurality of resistors in proximity to the cell, the plurality of resistors each comprising a resistive wire wrapped around the cell in the battery pack; and
   increasing the temperature of the cell in the battery pack;
   wherein the current from the charger does not pass through the cell.

2. The method of claim 1, wherein each resistor of the plurality of resistors is coupled to the electronic device.

3. A method for increasing temperature of a battery pack, the method comprising:
   determining whether a temperature of a cell in the battery pack is above a lower threshold temperature, the cell coupled to an electronic device that is a printed circuit board, and a thermal interface material arranged between the cell and the printed circuit board;
   sending a current, directly from a charger, to a balancing circuit coupled to the cell to dissipate heat from a resistor, the balancing circuit comprising a MOSFET, and the resistor comprising a resistive wire wrapped around the cell in the battery pack;
   increasing the temperature of the cell in the battery pack; and
   discontinuing the current from the charger once the cell has reached an upper threshold temperature;
   wherein the current from the charger does not pass through the cell.

4. The method of claim 3 further comprising, subsequent to increasing a temperature of the cell, determining whether the cell has reached an upper threshold temperature.

5. The method of claim 3, wherein the resistor is coupled to the electronic device.

* * * * *